United States Patent [19]

Thomsen

[11] 3,994,237
[45] Nov. 30, 1976

[54] POWER SUPPLY FOR REALISTIC CONTROL OF MODEL RAILROAD ENGINES

[75] Inventor: J. Melvyn Thomsen, St. Joseph, Mich.

[73] Assignee: Heath Company, Benton Harbor, Mich.

[22] Filed: Oct. 6, 1975

[21] Appl. No.: 620,482

[52] U.S. Cl. .............................. 104/149; 307/228; 318/341
[51] Int. Cl.² ......................................... B60L 9/00
[58] Field of Search ........ 104/147 R, 147 A, 148 R, 104/149; 307/228, 268; 328/14, 185, 187; 318/341, 345 A, 345 E

[56] References Cited
UNITED STATES PATENTS

| | | | |
|---|---|---|---|
| 3,214,597 | 10/1965 | Jordan | 104/149 |
| 3,363,109 | 1/1968 | Wilhelm | 104/149 |
| 3,745,373 | 7/1973 | Jones | 307/228 |
| 3,902,139 | 8/1975 | Harrell | 307/228 |

*Primary Examiner*—Trygve M. Blix
*Assistant Examiner*—Reinhard J. Eisenzopf
*Attorney, Agent, or Firm*—William R. Sherman; Kevin McMahon; Joseph J. Kalika

[57] ABSTRACT

A power supply for realistically controlling a model railroad engine. For engine acceleration, the power supply provides an output signal having a linear ramp with pulses superimposed thereon. For constant speed operation, the supply produces a constant output voltage. For deceleration, the power supply produces a decreasing linear ramp signal with pulses superimposed thereon. Adjustment circuitry is provided for modifying the output waveshape so that realistic control can be achieved for different model engines having different operating characteristics.

22 Claims, 5 Drawing Figures

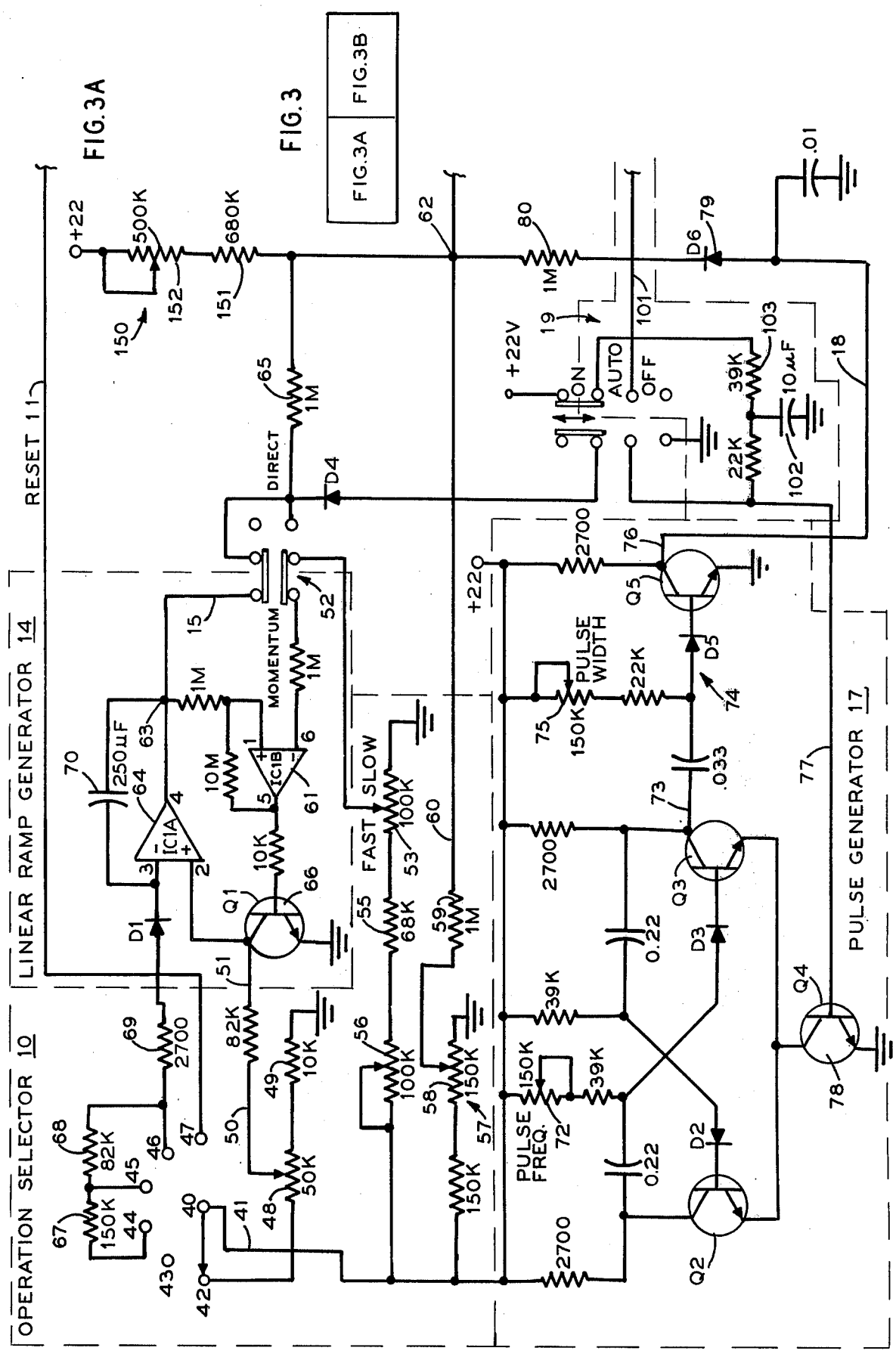

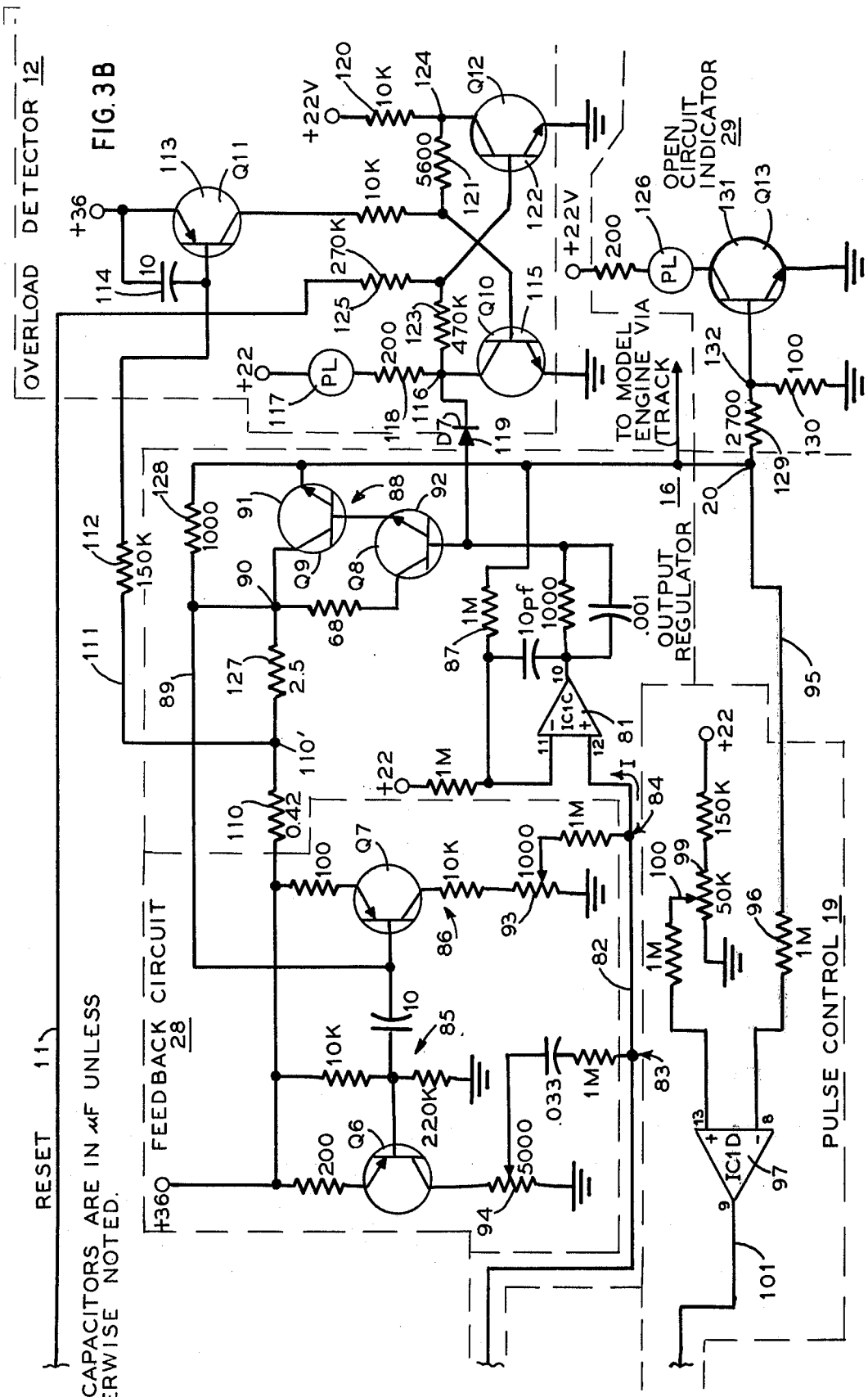

POWER SUPPLY FOR REALISTIC CONTROL OF MODEL RAILROAD ENGINES

BACKGROUND OF THE INVENTION

This invention relates to the field of model railroads and more particularly to power supplys for realistically controlling the operation of model railroad engines.

Known model railroad power supplies are connected in a suitable manner to power the engine and typically have a rheostat of the like for adjusting the output voltage. The engine is usually started by turning the rheostat wiper to gradually increase the output voltage. The engine remains stationary until the output voltage becomes sufficiently high to overcome the friction of the engine, causing it to leap forward suddenly at a speed proportional to the output voltage. Further increase in the output voltage causes an increase in the model engine speed. Conversely, decrease in output voltage causes the model to slow down. Such model movement is not very realistic.

Rheostat power supplies also cause model trains to slow down unrealistically when the train goes up a grade because the increased engine current causes the output voltage to drop. To compensate for this added slowdown on grades, the hobbiest must adjust the rheostat.

Hobbiests have long desired to simulate actual railroad movement and have developed more advanced model railroad power supplies in the attempt to provide more realistic model motion. Several such power supplies are described in articles appearing in a model railroad magazine (see Model Railroader, February, 1962, pages 56–67, Model Railroader, January, 1965 pages 60 and 61 and Model Railroader, March, 1969). The author of these articles suggests that realistic acceleration and deceleration of a model railroad engine can be achieved by providing an exponential voltage waveform having pulses of a large amplitude superimposed thereon. The described power supply with its exponential waveform, however, permits engine acceleration or deceleration which is rapid during the first time constant of the exponential curve and slower during subsequent time constant periods. Actual railroad engines, however, have acceleration or deceleration curves which more closely approximate a straight line than an exponential curve. As such, the model railroad power supplies described in the above mentioned articles do not produce realistic results.

In addition, these power supplies have proven difficult to use with some model railroad engines because many circuit adjustments are required to achieve optimum results and these controls interact with each other making optimum adjustment difficult.

In view of the foregoing difficulties of the prior art, it is an objective of the invention to provide a power supply to operate a model railroad engine in a manner realistically simulating the movement of an actual railroad engine.

It is yet a further objective of the invention to provide a power supply for realistic control of a model railroad engine which will maintain a substantially constant output voltage as the engine loading on the supply varies.

It is a further objective of the invention to provide a power supply for realistically controlling a model railroad engine which includes an overload protection circuit to prevent circuit damages if the output load current exceeds a permissable maximum.

It is atill another objective of the invention to provide a power supply for realistic control of a model railroad engine including an open circuit indicator to indicate when no power is being drawn from the supply.

In achieving these objectives, the power supply according to the invention includes four principal function sub-sections, namely, a linear ramp generator, an output regulator, a pulse generator, and a pulse control, all of which respond directly or indirectly to an operation selector. The linear ramp generator and pulse generator respectively produce a linear ramp signal and pulses during periods of time when the model is either accelerating or decelerating. The linear ramp signal and the pulse sigals are summed at a summing node to form the input to the output regulator. The output regulator responds to the summed signal to produce a linear ramp signal with pulses superimposed thereon. The pulse control circuit samples the output from the output regulator and turns the pulse generator off whenever the output linear ramp voltage is greater than a given magnitude. The power supply, however, continues producing a linear ramp voltage until a selectable maximum magnitude is reached. Thereafter, the power supply produces a constant magnitude signal to run the model engine at a constant speed.

A feedback circuit samples the output voltage and generates a positive feedback signal when the output voltage falls. The positive feedback signal is fed into the summing node causing the output regulator to increase the output voltage thereby maintaining substantially constant model railroad engine speed.

An overload detector is also provided for detecting excessive current supplied by the output regulator to the model railroad track. Upon detecting an overload, the circuit causes the output regulator to remove power from the track and sets an overload indicator to advise the operator. Upon resetting the overload detector circuit, however, the power supply again operates normally.

The power supply also includes an open circuit detector which samples the current drawn from the power supply itself. If this current falls to zero, an indicator is activated to signify that power is not being drawn from the power supply. This condition may indicate an engine derailment on a powered segment of track, a wiring failure, that no engine is currently operating on the powered segment of the track or any other condition where no current is drawn from the power supply.

DESCRIPTION OF THE DRAWINGS

The foregoing and other objects of the invention will become more fully apparent from the following detailed description of an embodiment of the invention taken in connection with the drawings which form a part of the original disclosure wherein:

FIG. 3 shows how FIGS. 3A and 3B fit together; and

FIGS. 3A and 3B are a detailed circuit diagram of the power supply.

DETAILED DESCRIPTION

Figure 1:
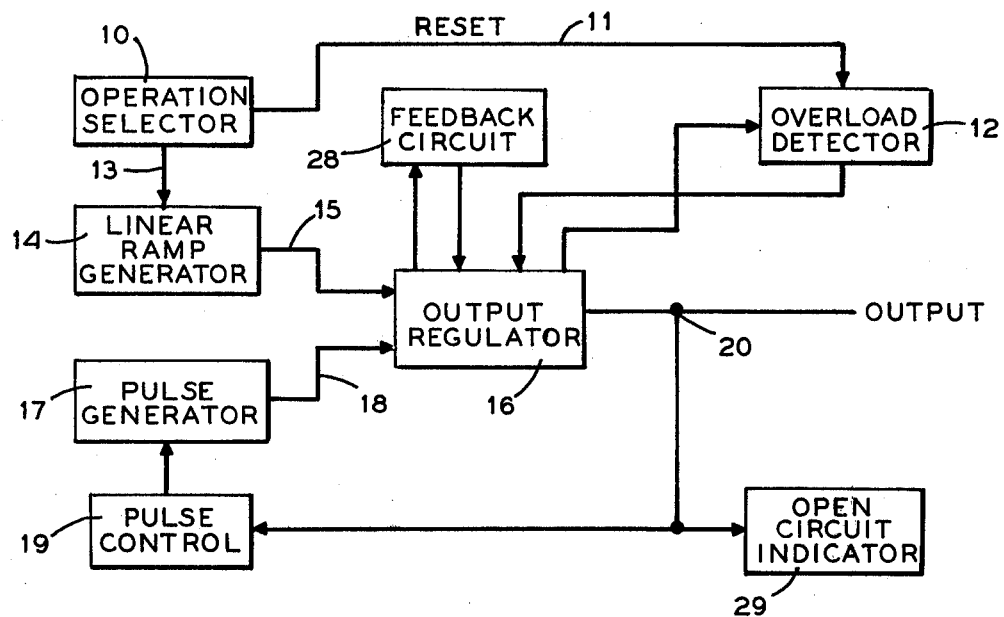
FIG. 1 is a system diagram of the power supply.

FIG. 1 is a system diagram of a power supply for model railroads and the like which includes an operation selector 10 for selecting one of a plurality of operation modes including acceleration, deceleration and momentum. Additionally, the operation selector 10 includes means for generating a reset signal on a reset wire 11 for resetting an overload detector 12, should an overload occur.

The operation selector 10 normally transmits signals over a wire 13 to a linear ramp generator 14. The linear ramp generator 14 produces an increasing or decreasing linear ramp voltage at its output whenever the operation selector 10 is set to either the acceleration or deceleraion mode respectively. When the operation selector 10 is set for momentum mode, the linear ramp generator 14 produces a constant output voltage. The output signal from the linear ramp generator 14 is transmitted over a wire, indicated at 15, to output regulator 16 which includes a summing node. The summing node adds all signals input thereto. The summed signals are then amplified by output regulator 16 to produce an output voltage at 20 which powers the model engine.

The power supply also includes a pulse generator 17 for producing pulses which are transmitted over a wire 18 to the summing node in the output regulator 16. The pulse generator 17 is controlled by a pulse control circuit 19 which responds to the voltage at power supply output 20. So long as the output voltage at 20 is below a selectable magnitude, the pulse generator 17 operates.

The output regulator 16 produces an output voltage which is proportional to the sum of all the input signals except when a pulse is present at which time the output has a maximum amplitude.

Figure 2:
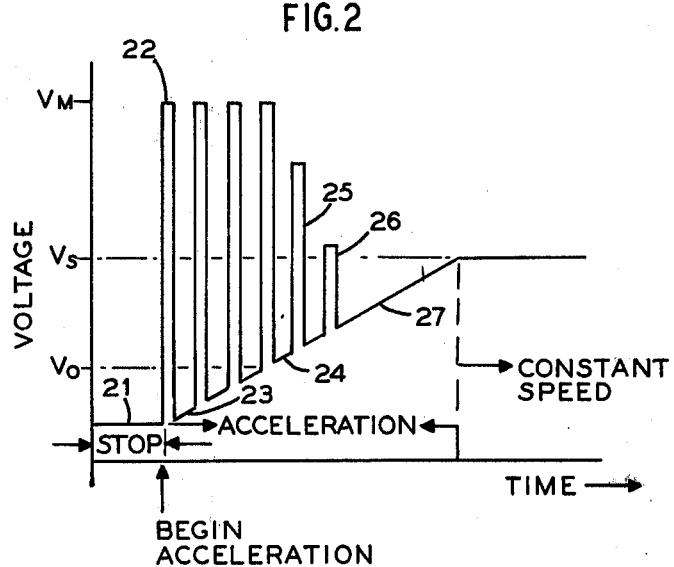
FIG. 2 is a voltage waveform for the power supply output showing the waveform during acceleration and constant speed operation.

When the operation selector 10 is positioned for accelerating a model railroad engine, the output voltage at 20 has a waveshape shown in FIG. 2, with an initial selectable and generally non-zero starting voltage indicated at 21. Advancing a speed control in the operation selector causes both the linear ramp generator 14 and the pulse generator 17 to operate and their outputs are summed at the summing node and amplified by the output regulator 16 to produce a rising linear ramp with pulses superimposed thereon. The pulses have a maximum voltage $V_m$ as indicated at 22 which, for the circuit of FIGS. 3A and 3B, is in the order of 20 volts. When the pulse signal from the pulse generator 17 disappears, the voltage at the output 20 falls to a value proportional to the ramp generator output as indicated at 23.

As indicated earlier, the pulse control 19 responds to the voltage at the output 20 to control the pulse generator 17. Specifically, when the linear ramp voltage at the output 20 exceeds a selectable value $V_o$ (shown at 24), the pulse control 19 generates a signal to gradually turn off the pulse generator 17. Subsequent pulses 25 and 26 from the generator 17 are produced and superimposed on the linear ramp signal but the amplitude of these pulses do not reach the peak amplitude $V_m$ because the pulse generator, while being turned off, produces pulses at its output which are reduced in amplitude. A circuit delay in the pulse control 19 prevents the pulse generator 17 from turning off instantaneously once the ramp voltage exceeds $V_o$.

After the pulse generator 17 is turned off, the rising linear ramp signal produced by the ramp generator 14 continues until the voltage at the output 20 reaches a selectable maximum level Vs. The output voltage at 20 then remains constant so long as the operation selector 10 remains in the same mode and the speed control is not further advanced.

The power supply of FIG. 1 operates in the opposite manner when the operation selector 10 is set to decelerate or "brake" the model railroad engine. In general, to slow the model engine the output voltage at 20 linearly decreases until the voltage at 20 falls below $V_o$, which causes the pulse control 19 to activate the pulse generator 17. Thereafter, the voltage at 20 comprises a linearly decreasing ramp signal with pulses superimposed thereon.

The provision of circuit adjustment means which permit both increasing or decreasing either the pulse width or the pulse rate makes the power supply highly flexible. Adjustment means for selecting the voltage $V_o$ provides further circuit flexibility. Other circuit adjustments control the acceleration rate, deceleration rate, the maximum and minimum output voltage for the power supply. All of these adjustments are useful in matching the output signal to the particular operating characteristics of a given model engine so that realistic movement of that engine is achieved.

The power supply, when the operation selector 10 is set to momentum mode, is operative to produce a substantially constant voltage at the linear ramp generator output 15 equal to that appearing at the ramp generator output at the instant the operation selector 10 is switched to momentum mode. This causes the voltage at 20 to remain substantially constant as well. Over a long period of time (in the order of minutes) the voltage will gradually fall, however. As such, the model continues to move at first at the achieved speed and then slowly decreasing. This simulates actual railroad operation when an engineer cuts back on power after acceleration and the train keeps moving due to its momentum though the speed gradually falls due to friction.

The power supply also includes a feedback circuit 28 for sensing the voltage at 20 and providing a positive feedback to maintain substantially constant output voltage regardless of the current being supplied by the output regulator 16. Also, an overload detector 12 monitors output current to detect excessive current being supplied by the output regulator 16 which may cause circuit damage. Should an overload occur, the detector 12 is to operative to have power removed from the output 20 thereby preventing possible circuit damage.

The power supply includes an open circuit detector 29 that provides a perceptable indication whenever power is available at 20 but not being drawn by the connected power distribution system for the model layout.

The foregoing has briefly described an embodiment of the present supply. A more detailed description of this embodiment is included below and also in the Heathkit Assembly Manual for Model RP-1065, Copyright 1975, and the entire contents of that manual is herein incorporated by reference.

OPERATION SELECTOR

The operation selector 10 is shown in greater detail in FIG. 3A. In this exemplary embodiment, the operation selector 10 comprises a stepping switch 40 which is mounted on a control panel (not shown) and provides a power connection between a wire 41, connected to a +22 volt supply, and one of six switch positions indicated respectively by the reference numerals 42, 43, 44, 45, 46 and 47. The first switch position 42 is for the acceleration mode while the second switch position 43 is for a "release" or "momentum" mode in which model engine speed remains constant. The third through the fifth switch positions, namely 44, 45 and 46, are for deceleration mode in which the rate of deceleration is progressively increased as the switch is stepped from the third to the fifth position. The sixth position is a reset position for resetting the overload detector 12.

When the switch 40 is in position 42 (acceleration mode) a power connection is made to a voltage divider formed of a variable resistor 48 and a fixed resistor 49. The wiper position of resistor 48 controls the positive voltage on a wire 50 that connects via an 82K ohm resistor to a wire 51 which forms one output of the operation selector 10. This adjustable voltage on the wire 51 changes the rate of acceleration of a powered model railroad engine, as described below in connection with the operation of the linear ramp generator 14.

The operation selector 10 includes a speed control with a throttle resistor 53 (mounted on the control panel, not shown), a fixed resistor 55 and an adjustable resistor 56 which are series connected between a +22 volt supply and ground. The voltage at the wiper of the throttle resistor 53 is adjustable and provides a variable voltage output of the operation selector 10 indicative of the engine speed desired by the hobbiest. The fixed resistor 55 and the variable resistor 56 are respectively selected and adjusted to produce a maximum voltage at the throttle resistor wiper which will cause the model engine to move at a maximum speed which is properly scaled to the maximum speed of a real engine of the same type.

The wiper of the throttle resistor 53 connects to a momentum/direct switch 52 which is provided to permit the operator to control the model railroad either directly or realistically from the throttle resistor 53. When the switch 52 is set to the direct position, the power supply operates substantially indentically to known power supplies and, thus, will not be further described. When the switch 52 is in momentum position, however, the power supply controls the model realistically. As such, the following discussion assumes that the switch 52 is set to the momentum position as shown in FIG. 3A.

The operation selector 10 also includes a starting voltage circuit 57 which comprises a fixed 150K resistor and a variable 150 K resistor 58 series connected between a +22 volt power supply and ground. The wiper of the resistor 58 is connected via a 1 Meg ohm resistor 59 to a wire 60. This configuration produces a substantially constant current which is injected into a current summing node 62 that forms the input to the output regulator 16. The wiper position of the resistor 58 adjusts the current injected into the summing node 62 to bias the voltage at the output 20 (FIG. 3B) to a non-zero level. As such, the power supply output voltage never goes lower than an adjustable minimum controlled by the setting of resistor 58. This minimum voltage is preferably adjusted so that the controlled model railroad engine does not move when the wiper voltage on the throttle resistor 53 is zero.

LINEAR RAMP GENERATOR

The linear ramp generator 14 produces a ramp signal which increases or decreases linearly when the switch 40 is set to acceleration mode or deceleration mode respectively. The principal element of the ramp generator 14 is an integrator circuit comprised of a current-differencing amplifier 64 (IC1A) with a capacitor 70 wired between the amplifier output (IC1A, pin 4) and the inverting input (IC1A, pin 3). The current-differencing amplifier 64 is preferably one of four such amplifiers in a module manufactured by National Semiconductor as an LM-3900 and referred to by National as a current-differencing amplifier or a Norton Amplifier. This amplifier operates in a manner such that when a current is driven into one of its inputs, the other input tends to draw the same current. While the above mentioned circuit type has proved effective for the present application, those of skill in the art will recognize that other current-differencing amplifiers or Norton Amplifiers which operate in the same manner can be utilized in the circuit of the invention for similar or other applications.

As indicated earlier, when the switch 40 is set to acceleration mode, a positive voltage appears at the operation selector output wire 51 whose level depends on setting of the wiper for resistor 48 and the value of resistor 49. The positive voltage at 51 is applied to and causes a current to flow into the non-inverting input (IC1A, pin 2) of the amplifier 64. A corresponding current is drawn by the non-inverting input (IC1A, pin 3) which comes from the amplifier output (IC1A, pin 4) via the capacitor 70. This current flow through the capacitor 70 causes the voltage at 63 to increase linearly, i.e., to produce a linear ramp signal at 63 whose slope is controlled by the current flowing into pin 2 of IC1A. The slope of the ramp signal is controlled by adjustment of resistor 48 and is made in conjunction with running a particular model railroad engine to assure that its acceleration is realistic.

A further advantage of the particular circuit configuration for the linear ramp generator 14 is that the linear ramp signal can be stopped before the circuit saturates and thereafter produce a signal at a constant voltage. It ca be restarted as well. To accomplish this, the output of the current-differencing amplifier 64 is connected via a 1 Meg ohm resistor to the non-inverting input (pin 1, IC1B) of a second current-differencing amplifier 61 which is wired as a comparitor for comparing the current into pin 1 with the current into pin 6, the later current being controlled by the setting of the throttle resistor 53. So long as the current into pin 1 is less than the current into the pin 6, the output voltage at pin 5 is low and transistor 66 is turned off. When the current into pin 1 is equal to that into pin 6, the output at pin 5 of amplifier 61 goes high, causing transistor 66 to conduct. Since the collector of transistor 66 is connected to pin 2 of IC1A, the current into the non-inverting input of amplifier 64 is diverted through transistor 66. As such, the integrator circuit stops producing the linear ramp signal at 63 and the voltage there remains constant. If the throttle resistor 53 is thereafter adjusted to lower the current into pin 6 of IC1B, the voltage at 63 is unaffected and the model engine will continue at the speed reached when the voltage at 63 became constant. This operation simulates real railroad operation where a train will not slow down even if the engineer cuts back the throttle because the train monentum will keep it moving.

On the other hand, if the throttle resistor 53 is adjusted to increase the current into pin 6 or IC1B after the voltage at 63 has been constant, the output of the amplifier 61 will go low turning off transistor 66. The voltage at 63 will then begin to rise linearly because a current will be flowing into pin 2 again. The ramp signal will increase until the current into pin 1 of IC1B is equal to the current into pin 6 at which time the voltage at 63 will again become constant.

When switch 40 is in deceleration mode, i.e., in positions 44, 45 or 46, the voltage at 63 decreases linearly at a rate determined by the total series resistance between the +22 volt supply and pin 3 of IC1A. When switch 40 is in position 44, resistors 67, 68 and 69 are all connected in series between the +22 volt supply and pin 3 or IC1A providing a current path for charging capacitor 70 in the opposite direction. When the switch 40 is charged to either position 45 or 46, the series resistance between the +22 volt supply and pin 3 is reduced thereby increasing the rate capacitor 70 charges in the opposite direction as well as increasing the negative slope of the voltage at 63. As such, switch position 44 corresponds to the slowest braking rate while position 46 corresponds to the fastest braking rate with position 45 corresponding to an intermediate braking rate.

The signal at 63 is coupled by a 1 Meg ohm resistor to the current summing node 62. Since the resistance between the node 62 and the linear ramp generator 14 is so high, substantially all the voltage at 63 is dropped across the 1 Meg ohm resistor and a current is injected into node 62 while is proportional to the voltage at 63. As such, the linear ramp generator 14 acts like a current source to produce either a ramp or a constant current into node 62 depending on the operation selector mode and the attained speed of the model.

PULSE GENERATOR

FIG. 3A also shows a pulse generator 17 which, for the exemplary embodiment there shown, comprises an astable multi-vibrator, including transistors Q2 and Q3 and various resistors and capacitors connected thereto in a well known configuration whose frequency of operation is adjustable controlled by a variable resistor 72 also mounted on the control panel (not shown). The setting for this resistor 72 and the resistance value for the other resistors in the astable multi-vibrator is selected, for the embodiment shown, to produce pulses at the output 73 with a frequency adjustable between 40 and 80 pulses per second. The actual pulse rate used for controlling a particular model railroad engine is selected by trial and error with that model engine so as to produce realistic acceleration and deceleration.

The pulse generator 17 also includes a width control circuit, shown generally at 74, which has a variable pulse width control resistor 75. When transistor Q3 turns on, a negative transistion pulse is coupled through the 0.033 μF capacitor connected to its collector which causes transistor Q5 to turn off. As such a positive going voltage pulse occurs at the collector 76. The collector 76 voltage remains high so long as the base voltage to transistor Q5 remains below 0.6 volts which is controlled by the setting for the pulse width control resistor 75 in the charging path of the 0.033 μF. capacitor. When the base of transistor Q5 reaches at least 0.6 volts, it turns on causing the voltage at 76 to fall. For the circuit elements of the exemplary embodiment, the pulse width is adjustable from 0.5 to 3.5 milliseconds with the exact pulse width being selected so as to achieve realistic accelerating and decelerating characteristics of a particular model railroad engine.

The pulse generator 17 includes a transistor 78 connected in series with the astable multi-vibrator which responds to an externally generated allow pulse signal applied to the wire 77. Whenever the allow pulse signal is present, the voltage on the wire 77 is sufficiently positive to cause transistor 78 to conduct thereby permitting the astable multi-vibrator to operate. On the other hand, when the allow pulse signal is not present, the voltage on the wire 77 is sufficiently low that the transistor 78 will not conduct thereby turning off the astable multi-vibrator. As such, the pulse generator 17 is controlled by the voltage level on the wire 77.

The positive voltage pulses generated by the pulse generator 17 are connected via a diode 79 and a 1 Meg ohm resistor 80 to the node 62. As such, the pulse generator 17 acts like a current source to inject a pulse current into node 62. The pulse generator 17 is designed to produce current pulses having sufficient amplitude by themselves to drive the output regulator 16 (FIG. 3B) to its maximum which, for the embodiment shown, produces a voltage pulse of approximately 20 volts at the output 20 (FIG. 3B). Pulses of this amplitude have proven to be necessary to cause typical model railroad engines to accelerate and decelerate realistically. The amplitude of the output signal at 20, on the other hand, is substantially proportional to the sum of the currents injected into the summing node 62 at times when a pulse current is not injected into node 62 by the pulse generator 17.

BIAS ADJUST CIRCUIT

A bias adjust circuit, shown generally at 150 in FIG. 3A, is provided to produce a bias current into the summing node 62 and includes a fixed resistor and an adjustable resistor 152 seris connected between the +22 volt power source and the summing node 62. The component values and the adjustment thereof for the resistors of the bias adjust circuit 150 are selected so that output voltage at 20 is zero volts when no current, other than that from the bias adjust circuit 150, flows into the node 62.

OUTPUT REGULATOR

Referring now to FIG. 3B, the output regulator 16 is connected at its input via a wire 82 to the summing node 62 (FIG. 3A). To simplify the drawings, two additional inputs to node 62 are shown as connections to the wire 82 at 83 and 84. The connections at 83 and 84 provide points for injecting currents respectively from an AC compensation feedback circuit 85, and a DC compensation feedback circuit 86 both of which increase the drive current to the output regulator 16 whenever AC or DC loading respectively causes the output voltage at 20 to drop.

All currents injected into the summing node 62 are added together to form an input current I to the non-inverting input (pin 12) to the current-differencing amplifier 81 (IC1C). The inverting input to amplifier 81 is connected to the +22 volt supply via a 1 Meg resistor to provide biasing and also through a 1 Meg ohm feedback resistor 87 connected to the output 20. The amplifier 81 drives the output stage 88 which comprises two Darlington connected transistors 91 and 92. For the circuit values and configuration shown in FIG. 3B, IC1C and transistors 91 and 92 form a unity gain voltage regulator. The voltage at the output 20 is proportional to the sum of the currents into node 62 when transistors 91 and 92 are not saturated.

FEEDBACK CIRCUIT

The feedback circuit 28 is connected via a wire 89 to a node 90 at the collector of the transistor 91. The node 90 is connected to a +36 volt supply through two resistors 110 and 127. As such, the voltage at node 90 as well as that at 20 goes down due to the increased voltage drop across resistors 110 and 127, as transistors 91 and 92 conduct more current. In order to maintain a substantially constant voltage at 20 as load current increases, the feedback circuit 28 responds to the reduced voltage at node 90 by injecting more drive current via points 83 and 84 into node 62 causing increased drive to the amplifier 81. This increased drive to amplifier 81 causes transistor 91 and 92 to be more conductive thereby increasing the output voltage at 20.

Increased current into point 84 is provided by the DC feedback compensation circuit 86 which responds to a DC voltage drop at 90 by causing transistor Q7 to conduct more current. This causes the voltage at the wiper of resistor 93 to go up thereby increasing the current injected therefrom to point 84.

The AC feedback compensation circuit 85 responds to AC voltage changes at 90 which are coupled to the base of transistor Q6 via a 10 $\mu$F. capacitor. As the AC voltage at 90 falls, transistor Q6 is turned on causing the AC voltage at the wiper of resistor 93 to go up. This increased AC voltage is coupled via a capacitor and a 1 Meg ohm resistor to produce an increased AC current into point 83.

The extent of DC and AC feedback is controlled by resistors 93 and 94 which are set for a particular model railroad engine to achieve realistic operation for that engine.

PULSE CONTROL CIRCUIT

As indicated earlier, a pulse control circuit 19 is provided to actuate the pulse generator 17 whenever the voltage at the output 20 is below a pulse cutoff voltage $V_o$. The pulse control circuit 19 connects via a wire 95 and a 1 Meg ohm resistor 96 to the output 20. The resistor 96 also connects to the inverting input (pin 8, IC1D) of the current amplifier 97 which is connected to compare the current into pin 8 with the adjustable current into pin 13. The adjustable current at pin 13 is generated by an adjustable current generator comprised of a 1 Meg ohm resistor connected between pin 13 and the wiper 100 of a variable resistor 99 which is series connected between ground and a 150 K resistor, the later resistor also being connected to a +22 volt supply. When the current into the inverting input of amplifier 97 equals or exceeds the current into the non-inverting input, i.e., when the voltage at 20 equals or exceeds the volage at 100, the output voltage at 101 goes low or to about zero volts. Conversely, when the current at the inverting input (pin 8, IC1D) is less than the current into the non-inverting input (input 13, IC1D), the output voltage at 101 is high (at approximately +22 volts for the circuit shown). The voltage at 100 corresponds to the pulse cutoff voltage at 20 and controls the pulse generator 17 in the following manner. When power is turned on, the voltage at the output 20 is low and below that at 100. Consequently, the voltage at 101 is high. The high voltage at 101 connects via an on/auto/off switch when in its auto position to a resistor 103 and a capacitor 102 which is charged thereby. The voltage on the capacitor 102 is coupled via a 22K ohm resistor to the base of the transistor 78 which is turned on when capacitor 102 is charged. The high voltage at wire 77 created by the charge on capacitor 102 corresponds to the previously mentioned allow pulse signal which turns the pulse generator 17 on.

When the voltage at output 20 is equal to or greater than the pulse cutoff voltage at 100, the voltage at 101 is low thereby creating a discharge path via resistor 103 for discharging capacitor 102. Once the voltage across capacitor 102 falls sufficiently so that the voltage at the base of transistor 78 is less than 0.6 volts, transistor 78 is turned off and this turns off the pulse generator 17. As such, when the allow pulse signal is removed from the wire 77 the pulse generator 17 is turned off.

The capacitor 102 discharges at a rate determined by the resistance 103 in the discharge path. The resistance 103 is chosen to produce a discharge time for capacitor 102 that is great enough so pulses at the output 20 will not cause the pulse control 19 to turn off the pulse generator 17. As such, the capacitor 102 discharge time is greater than the time required for the pulse generator 17 to produce at least two pulses thereby causing the pulse amplitude into node 62 to gradually decrease over several pulse periods as the pulse generator 17 is turned off. This causes the peak pulse output voltage at 20 to gradually fall as the pulse generator 17 turns off as shown in FIG. 2.

The diode D4 provides a path from the wire 77 to the ramp generator output which discharges capacitor 102 whenever the voltage at 63 is below the voltage across the capacitor 102 which will be drawn down to about 0.6 volts whenever the voltage at 63 is zero. As such, whenever the linear ramp generator output voltage at 63 is zero, the pulse generator 17 is turned off.

It will be clear to those of skill in the art that the pulse control 19, though it has been described as responding directly to the output signal at 20 being above a given level by causing the pulse generator 17 to turn off, can also respond directly to the ramp generator output voltage at 63. To make this circuit change, the wire 95 need only be disconnected from the output 20 and connected to 63. A subsequent adjustment of the resistor 99 may be necessary in order to produce an identical output signal at 20 for this alternative wiring. The operation of the circuit for either wiring, however, is the same in that the pulse generator is turned off whenever the level of the linear ramp signal is greater than a given level.

It will also be clear to those of skill in the art that a delay in the pulse control circuit 19 for turning off the pulse generator 17 following the detection of a voltage above a given level is not necessary for the above described circuit modification because no pulses are present at 63. One way to remove the delay from the pulse control circuit 19 is simply to remove capacitor 102. The delay feature may be left in the circuit if desired.

OVERLOAD DETECTOR

As indicated above, the model railroad power supply includes an overload detector circuit 12 which is operative to cause the voltage at the output 20 to fall to zero after the output regulator 16 delivers too much current. Output current is sensed by monitoring the voltage drop across the resistor 110 in the output regulator 16. Point 110' is connected via a wire 111 and a resistor 112 to the base of a transistor 113 so that as the voltage drop across the resistor 110 increases due to increased output current, the capacitor 114 is charged in a direction to forward bias the transitor 113. The resistance of resistors 110 and 112 are selected so that the transistor 113 begins conducting when the current through transistors 91 and 92 becomes excessive.

The overload detector 12 includes a latching circuit (a bistable multi-vibrator) including transistors 115 and 122. It is assumed initially in the following discussion that transistor 122 is conducting and transistor 113 is off. Consequently, the voltage at 124 is near zero volts and there is insufficient drive current through resistor 121 to turn transistor 115 on. When a current overload is detected and transistor 113 is turned on, transistor 115 is turned on causing the voltage at 116 to fall to near zero volts leaving insufficient drive through resistor 123 to turn on transistor 122. Consequently, transistor 122 is turned off when transistor 113 is turned on.

When transistor 122 turns off, the voltage at point 124 rises sufficiently so that drive current is available through resistor 121 to keep transistor 115 conducting even if transistor 113 turns off. While transistor 115 is conducting, current passes through the pilot lamp 117 and resistor 118 causing the lamp 117 to be ignited.

The low voltage at point 116 when transistor 115 is on is coupled via a diode 119 to the base of transistor 92. This causes the base drive to transistor 92 to be directed through diode 119 and transistor 115 to ground thereby turning off both transistor 91 and 92. This will reduce the current through resistor 110 to near zero so that capacitor 114 will discharge and transistor 113 will turn off.

A reset circuit is provided to turn transistor 115 off thereby allowing the output regulator 16 to operate normally. As noted earlier the reset circuit includes the switch 40 with a reset position 47 for connecting the +22 volt supply to the reset wire 11. The reset wire 11 connects via a resistor 125 to the base of transistor 122. Transistor 122 is turned on whenever switch 40 is in position 47. By turning transistor 122 on, the volage at point 124 falls to near zero volts thus causing transistor 115 to turn off thereby returning the bistable multivibrator of the overload detector 12 to its initial or normal state.

OPEN CIRCUIT INDICATOR

The open circuit indicator 29 includes means responsive to the voltage at the output 20 to provide a humanly perceptable indication when no current is being drawn by the connected model railroad layout. When substantially zero current is conducted by the transistor 91, current through the path including resistors 110, 127, 128, 129 and 130 forward biases the base emitter junction of transistor 131 to turn it on. When transistor 131 is on, current passes through a pilot lamp 126 which is ignited thereby providing a visual indication that the output 20 is connected to an open circuit. On the other hand, when current is being drawn by the model railroad layout, the voltage at the output 20 is lower than when an open circuit is present. The value of resistors 129 and 130 is selected so that insufficient voltage is available at the connection point 132 to turn transistor 131 on when the output voltage at 20 is within its normal operating range.

The foregoing discussion has made reference to a preferred embodiment of the invention as shown in FIG. 3A and FIG. 3B The circuit component values shown therein and in the table below which supplements the drawings have proved to be satisfactory for the intended application.

| Circuit Components | |
|---|---|
| D1, D2, D3, D5, D6, D7 | IN4149 |
| D4 | IN191 |
| Q1, Q2, Q3, Q4, Q5, Q10, Q12, Q13 | MPS-A20 |
| Q6, Q7, Q11 | 2N4121 |
| Q8 | MJE-181 |
| Q9 | 2N3055 |
| IC 1A, 1B, 1C, 1D | LM3900 |

The circuit has other applications for which other circuit component values are likely to provide better results than the specific component values described herein. Those of skill in the art will have no difficulty in substituting such other components into the described circuit to adapt the invention to their particular application. It will also be clear that other circuit arrangements can be substituted for the functional units of the invention as shown in FIG. 1. These and other modifications to the invention will be readily evident to those of skill in the art and can be made without departing from the spirit and scope of the invention as defined by the following claims.

I claim:
1. A power supply for realistic control of a model railroad engine comprising, in combination:
   a linear ramp generator for producing a linear ramp signal;
   a pulse generator for generating a train of pulses;
   an output circuit with an output terminal responsive to both said linear ramp signal and said train of pulses, said output circuit producing an output signal at said output terminal for powering the model railroad engine, said output signal having a level proportional to said linear ramp signal in absense of a pulse and at a maximum level when a pulse is present; and
   means for disabling said pulse generator whenever the level of said linear ramp signal is greater than a given level.
2. The power supply of claim 1 wherein said disabling means responds directly to said linear ramp signal.
3. The power supply of claim 1 wherein said disabling means responds directly to said output signal.
4. The power supply of claim 1 wherein said generated pulses are each substantially uniform in width and generated at a substantially uniform rate.
5. The power supply of claim 4 wherein said uniform rate is selectable and said uniform width is selectable.
6. The power supply of claim 1 additionally including control means connected to said ramp generator to adjust the slope of said linear ramp signal.
7. The power supply of claim 1 additionally including overload detection means connected to said output circuit to detect when current greater than a given level is supplied by said output circuit to said output terminal, said overload detection means being operative to cause said output circuit to remove power from said output terminal when an overload is detected.
8. The power supply of claim 1 additionally including an open circuit detector connected to said output terminal for providing a perceptable indication whenever power is available at said output terminal and current is not drawn from said output terminal.
9. The power supply of claim 1 additionally including an operation selector connected to said ramp generator, said operation selector being operative to cause said ramp generator to selectively produce either a linearly rising ramp signal or a linearly falling ramp signal.

10. The power supply of claim 9 wherein said operation selector includes selectively activatable means to cause said ramp generator to produce a constant output signal at said ramp generator output terminal, said constant output signal having an amplitude substantially equal to the amplitude of said ramp signal at the moment of actuation of said selectively actuatable means.

11. The power supply of claim 9 additionally including a speed selector connected to said ramp generator, said speed selector being operative with said ramp generator to select the maximum amplitude attainable by said ramp signal, said ramp signal, after reaching said maximum amplitude remaining at said maximum amplitude thereafter until said operation selector is subsequently changed.

12. The power supply of claim 1 additionally including feedback means to maintain said output signal voltage at a substantially constant level as varying current is drawn by the model railroad engine.

13. A signal generator comprising, in combination:
a current-differencing amplifier with an inverting input, a non-inverting input and an output;
a capacitor connected between said output and said inverting input;
means to input a constant current signal into said non-inverting input to produce a linearly rising ramp signal at said output;
an adjustable voltage source producing an adjustable DC voltage; and
comparison circuit means for comparing the voltage at said output with said adjustable voltage to connect said non-inverting input to ground whenever the voltage at said output is at least as large as said adjustable voltage to cause the voltage at said output to remain constant thereafter.

14. The signal generator of claim 13 additionally including means to selectively disconnect said constant current signal from said non-inverting input and connecting said non-inverting input to ground via a resistor and further including a second current source connected to said inverting input to produce a linerly decreasing ramp signal at said output.

15. The signal generator of claim 14 additionally including:
a pulse generator for producing a train of pulses;
an output circuit with an output terminal responsive to both train of pulses and to said current-differencing amplifier output, said output circuit producing an output signal at said output terminal for powering a model railroad engine, said output signal having a level proportional to the signal at said current-differencing amplifier output in absense of a pulse and at a maximum level when a pulse is present; and
means to disable said pulse generator when the level of said ramp signal is greater than a given level.

16. The signal generator of claim 13 additionally including:
a pulse generator for producing a train of pulses;
an output circuit with an output terminal responsive to both said train of pulses and to said current-differencing amplifier output, said output circuit producing an output signal at said output terminal for powering a model railroad engine, said output signal having a level proportional to the signal at said current-differencing amplifier output in absence of a pulse and at a maximum level when a pulse is present; and
means to disable said pulse generator when the level of said ramp signal is greater than a given level.

17. A power supply for realistic control of a model railroad engine comprising, in combination:
an adjustable speed selector for generating a speed signal for controlling the maximum speed attainable by the model railroad engine;
an operation selector for selectively producing a first and a second operation signal for accelerating and decelerating the model railroad engine respectively;
a linear ramp generator responsive to said speed signal and said first operation signal to produce a rising linear ramp signal and responsive to said speed signal and said second operation signal to produce a falling linear ramp signal, said ramp signal always having an amplitude less than or equal to a value related to said speed signal;
a pulse generator for producing a train of pulses;
an output circuit with an input and an output terminal, response to said train of pulses and to said ramp signal at said input to produce an output signal at said output terminal to power the model railroad engine, said output signal having a maximum output amplitude whenever a pulse is present and having an output amplitude proportional to the amplitude of said ramp signal whenever a pulse is not present; and
a pulse control circuit for disabling said pulse generator when said ramp signal is above a given amplitude.

18. The power supply of claim 17 wherein said operation selector includes means to select the rate of model railroad engine acceleration or deceleration.

19. The power supply of claim 17 additionally including an overload detector connected to said output circuit for detecting excessive current being supplied to said output terminal, said overload detector causing power to be removed from said output terminal when an overload is detected thereby.

20. The power supply of claim 17 additionally including an open circuit detector connected to said output terminal for providing a humanly perceptable signal whenever power is available at but not drawn from said output terminal.

21. The power supply of claim 17 wherein said operation selector includes means to select a "momentum" mode of operation to cause said ramp generator to produce a substantially constant amplitude signal substantially equal to the ramp signal amplitude at the instant said selector is switched to "momentum" mode.

22. The power supply of claim 17 additionally including feedback means responsive to said output signal to provide an additional input to said output circuit to maintain the voltage at said output terminal at a substantially constant level as current supplied to said output terminal varies.

* * * * *

UNITED STATES PATENT OFFICE
CERTIFICATE OF CORRECTION

Patent No. 3,994,237      Dated November 30, 1976

Inventor(s) J. Melvyn Thomsen

It is certified that error appears in the above-identified patent and that said Letters Patent are hereby corrected as shown below:

IN THE SPECIFICATION:

Column 4, line 46, delete first occurrence of the word "to".

Column 6, line 66, change "or" to --of--.

Column 7, line 12, change "or" to --of--.

Column 7, line 28, change "while" to --which--.

Column 8, line 35, change "seris" to --series--.

Column 9, line 54, change "volage" to --voltage--.

Column 11, line 38, change "volage" to --voltage--.

IN THE CLAIMS:

Column 13 (Claim 15), line 48, change "14" to --13--.

Signed and Sealed this

Sixth Day of September 1977

[SEAL]

Attest:

RUTH C. MASON      LUTRELLE F. PARKER
*Attesting Officer*      *Acting Commissioner of Patents and Trademarks*